United States Patent [19]
Goerke

[11] 3,799,409
[45] Mar. 26, 1974

[54] SHIPPABLE DISPENSING CONTAINER
[75] Inventor: Ariste W. Goerke, Sylvania, Ohio
[73] Assignee: Owens-Corning Fiberglas Corporation, Toledo, Ohio
[22] Filed: Oct. 11, 1972
[21] Appl. No.: 296,689

[52] U.S. Cl............ 222/561, 93/36 DA, 93/55.1 R, 229/17 R
[51] Int. Cl............................................. B65d 5/72
[58] Field of Search............ 221/305, 306; 229/7 R, 229/7 SC, 23 A, 17 R, 17 SC; 105/282; 93/36 DA, 49 M, 55.1 R; 222/142.8, 502, 559, 561

[56] References Cited
UNITED STATES PATENTS
3,606,969  9/1971  Voytko......................... 229/17 B X
1,807,447  5/1931  Smith.............................. 105/282 R
3,207,412  9/1965  Bronte et al. ..................... 229/17 B Primary Examiner—Stanley H. Tollberg
Assistant Examiner—Joseph J. Rolla
Attorney, Agent, or Firm—Staelin & Overman; Ronald C. Hudgens

[57] ABSTRACT

A shippable container of corrugated board for handling and dispensing flowable material. The container includes a closure arrangement for its bottom comprising a pair of opposing flaps turned inwardly in their closed positions. The flaps are dimensioned such that their opposing inner margins are spaced apart to define an opening for discharge of flowable material. A cover member is held on the container for movement effective to open and close the discharge opening.

14 Claims, 8 Drawing Figures

PATENTED MAR 26 1974 3,799,409
SHEET 1 OF 2
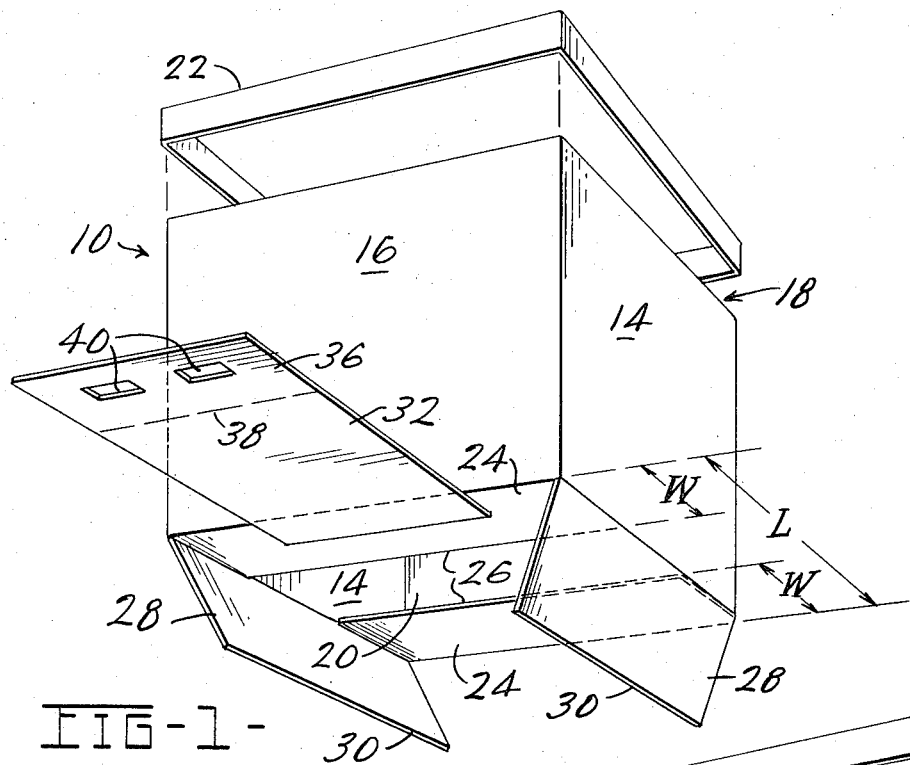
FIG-1-
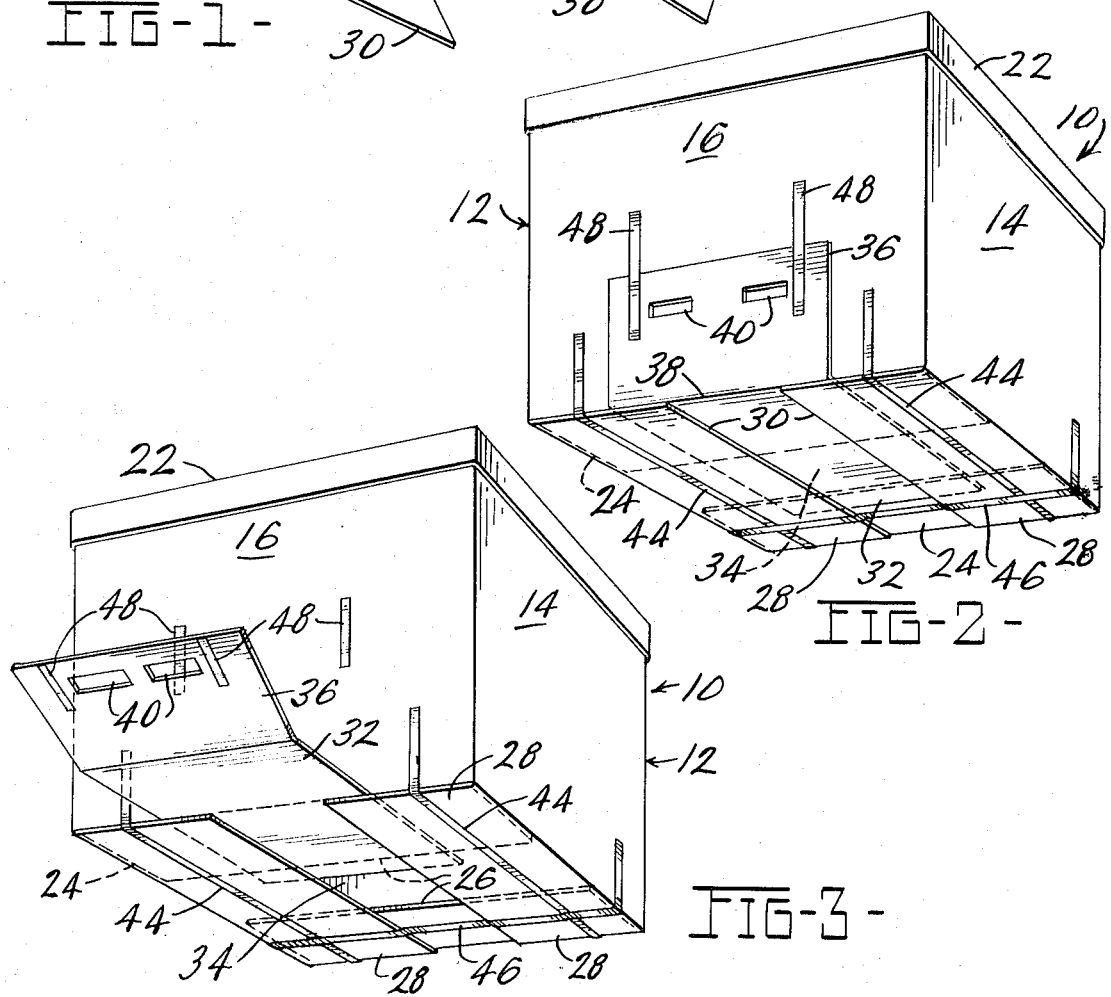
FIG-2-
FIG-3-

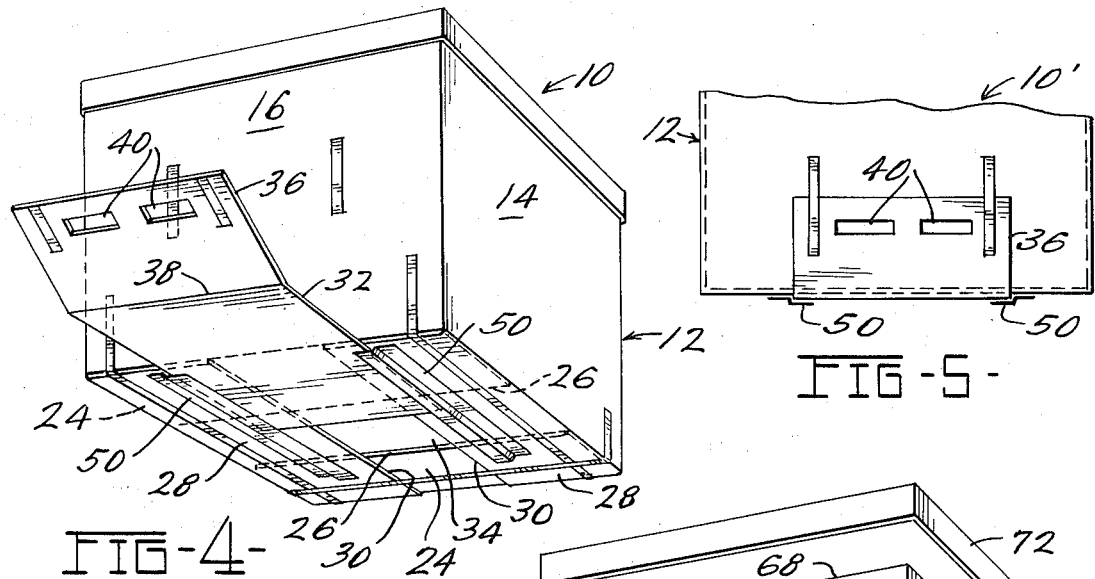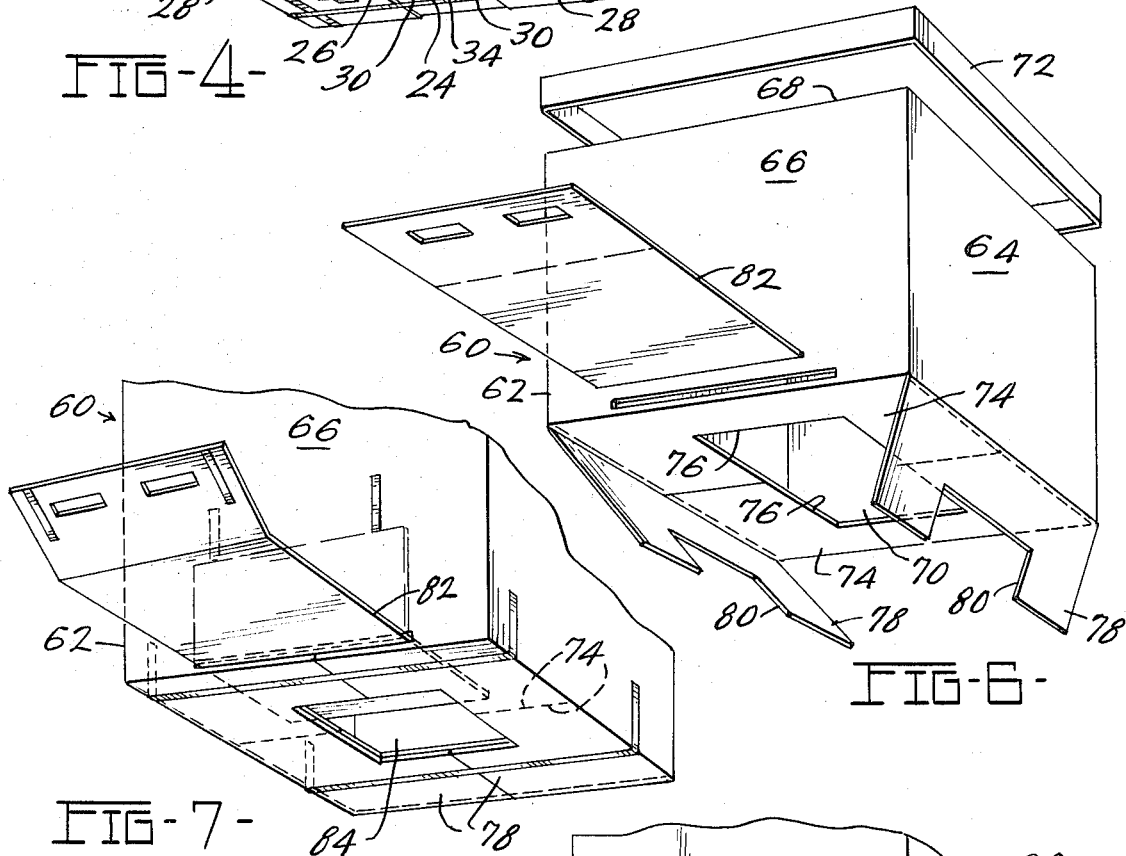

SHIPPABLE DISPENSING CONTAINER

BACKGROUND OF THE INVENTION

There are a variety of industrial operations that dispense smaller bulk amounts of flowable material from hoppers. This is especially true in the production of glass fiber reinforced plastic articles. For example, chopped glass strand is dispensed into hoppers and mixing equipment that blends chopped glass strand with resin to produce molding compound. This molding compound can subsequently be fed into transfer, press and injection molding machines.

It has been a practice to ship bulk amounts of discrete material like chopped glass strand in conventional top discharge corrugated board cartons or containers, which can hold amounts up to 1,500 pounds and more.

The use of top discharge cartons has been an awkward practice. Manufacturers have needed expensive carton or container inverting equipment to discharge the heavy bulk contents of top discharge containers into hoppers or mixing equipment.

Consequently, there has grown a need for a new and improved dispensing arrangement for shippable corrugated board containers. And this need is especially strong for an inexpensive shippable container that also functions as a hopper or dispensing container.

SUMMARY OF THE INVENTION

It is an object of the present invention to provide an improved shippable container of foldable sheet material that also dispenses bulk flowable material through an opening in its bottom wall structure.

It is another object of the invention to provide a container of foldable sheet material than can dispense flowable material without being inverted.

It is yet another object of the invention to provide an improved container of foldable sheet material for dispensing discrete material from its bottom wall structure that is easily made using standard container making equipment.

These and other objects are obtained by a container having opposing sidewalls that use a bottom closure means including a first pair of end flaps each connected to one of an opposing pair of side walls and secured in inwardly turned closed positions to form a portion of a wall structure across the open bottom; each of the inwardly turned first pair of flaps is dimensioned to have at least a portion of its inner margin laterally spaced apart with respect to the inner margin of the other of the first pair of flaps. The closure means further includes a second pair of flaps each connected to one of another opposing pair of sidewalls and secured in inwardly turned closed positions; each of the inwardly turned pair of flaps is dimensioned to have at least a portion of its inner margin laterally spaced with respect to the inner margin of the other of the second pair of flaps. These laterally spaced apart margin portions define an opening for discharge of flowable material held in the container. The closure means also includes a cover for the discharge opening held on the container for movement effective to open and close the discharge opening.

Other objects and advantages will become apparent as the invention is described in more detail with reference made to the accompanying drawings.

DESCRIPTION OF THE DRAWINGS

FIG. 1 is an exploded view of a preferred embodiment of a container according to the principles of the invention. The FIG. 1 shows a closure arrangement including two pairs of opposing bottom flaps and a cover member or slip sheet for a bottom discharge opening defined by the flaps in their inwardly turned closed positions.

FIG. 2 is a perspective view of the container in FIG. 1 with pairs of flaps secured in their inwardly turned closed positions and with the slip sheet in slide fit relation between the pairs of flaps in a position completely covering the discharge opening.

FIG. 3 is a perspective view of the FIGS. 1 and 2 with the slip sheet moved to partially open the bottom discharge opening.

FIG. 4 is a perspective view of a portion of another container according to the principles of the invention. A slip sheet is in a position partially uncovering the bottom discharge opening of a bottom closure arrangement.

FIG. 5 is a somewhat enlarged side elevation view that more clearly shows the guide supports on the exterior of the container that movably holds the slip sheet.

FIG. 6 is an exploded view of another container according to the principles of the invention.

FIG. 7 is a perspective view of a portion of the container shown in FIG. 6. The bottom closure arrangement is shown with a slip sheet moved to partially uncover a bottom discharge opening.

FIG. 8 is a simplified perspective view of a portion of another container according to the principles of the invention.

DESCRIPTION OF THE PREFERRED EMBODIMENTS

Containers of the invention are especially useful in handling bulk amounts of discrete material such as a body of individual short length bundles of glass strand (chopped glass strand). However, containers of the invention are useful in handling flowable material generally. And this can include liquid as well as particulate material.

FIGS. 1 through 3 illustrate a preferred container embodiment. The container is made of foldable container material and denoted by the reference numeral 10. Referring more particularly to FIG. 1, it can be seen that the container 10 includes a hollow body portion 12 that includes two pairs of parallel and opposed spaced apart sidewalls 14 (only one can be seen) and 16 (only one can be seen) that define rectangular open ends, i.e., an open top 18 and an open bottom 20.

A removable cap 22 fits over the open top 18.

A closure means effective to dispense discrete material from the bottom of the container 10 forms a wall structure normal to the sidewalls across the open bottom 20. As shown the bottom end closure arrangement includes an opposing pair of underlying rectangular flaps 24 each with an inner side margin or edge 26, an opposing pair of rectangular flaps 28 each with an inner side margin or edge 30 and a slip sheet member or cover 32. As shown each of the flaps 24 are the same size and each of the flaps 28 are the same size.

Each of the flaps 24 and 28 has a width that is less than one-half the bottom dimension along which such width portion extends or projects. For example, in FIG. 1 the width "w" of the flaps 24 are less than one-half the length "L" of the bottom opening 20. Hence, the opposing underlying flaps 24 and opposing overlying flaps 28 neither abut nor overlap at their inner margins. When the flaps are turned inwardly in their closed position, their inner margins are in opposed spaced apart relation. And these spaced apart margins define an opening 34 for discharge of discrete material held in the container 10; see FIGS. 2 and 3. The opening 34 is shown centrally located in the bottom wall structure.

The size of the flaps 24 and 28 are dimensioned to provide an opening 34 of sufficient size to permit discharge of discrete material held in the container 10. The width of these flaps can be changed to provide a desired size opening 34. And the size of opposing flaps can be made unequal to locate a discharge opening at different locations in the end wall structure.

The solid slip sheet or member 32 is slidably held between the underlying flaps 24 and overlying flaps 28. As can be more clearly seen in FIGS. 2 and 3, the slip sheet 32 is movable between the pairs of flaps along a path effective to open and close the opening 34. Accordingly, the member 32 controls release of material from the container 10 through the opening 34. The sheet 32 is shown somewhat smaller in size than the open bottom 20 but, of course, larger than the opening 34. And the sheet 32 includes an extension portion 36 foldable along a line 38. The extension 36 includes a pair of hand grip openings 40 that an operator can grasp for movement of the sheet 32.

In preferred forms of the invention the body portion and flaps of the container are made of fibrous sheet material such as corrugated board and fiberboard. The body portion 12 and flaps 24 and 28 shown in FIGS. 1 through 3 are made from a single blank of corrugated board. Hence, the flaps are integral with the body portion and fold inwardly along conventional fold lines. For larger sizes of the container 10 it is preferable to use double wall corrugated board such as 500 pound DW. The increased board weight is especially needed when the container 10 is used to handle and dispense discrete material such as in chopped glass strand in amounts up to from 1,000 to 15,000 pounds and more.

Containers according to the invention can use other types of foldable container material. For example, it is possible to use foldable sheet material such as plastic or metal. But fibrous sheet material is preferred for the body portion 12, flaps 24 and 28 and the cap 22.

The sheet 32 can be made of fibrous sheet material like the corrugated board used for the body portion 12 and flaps 24 and 28. But other container material can also be used. For example, the sheet 32 can be made of plastic or metal even when the remainder of the container 10 is made of fibrous sheet material. Hence, the sheet 32 can be made of a material different from the remainder of the container 10. In fact, under certain situations it may be advantageous to use a member 32 of stiffer material than fibrous sheet. As shown the member 32 is made of corrugated board.

For larger containers 10 used for bulk industrial amounts of discrete material it is often advantageous to provide a sheet 32 with a surface having a lower coefficient of friction than the engaging surfaces of the underlying and overlying flaps 24 and 28. This can be done, for example, by selecting the type sheet material to form the member 32 or surfacing the sheet material used to form the sheet 32. Surfacing materials such as polyethylene have been found effective. The sheet 32 as shown is surfaced on both sides with polyethylene to reduce the resistance against movement of the sheet 32. Alternately, the surfaces of the flaps 24 and 28 engaging the sheet 32 can be surfaced to reduce friction between the flaps and the sheet 32 to increase the ease of moving the sheet 32 between the pairs of flaps. Also, it is possible to surface both the flaps 24 and 28 and the sheet 32.

Referring more particularly to FIGS. 2 and 3 it can be seen that tape holds or secures the flaps 24 and 28 in their inwardly turned closed positions. As shown strips of tape 44 are disposed lengthwise on the exterior of each of the overlying flaps 28; these strips of tape 44 are positioned laterally outwardly of the sheet 32. A crossing length of tape 46 is disposed lengthwise of one of the underlying flaps 24 and widthwise of the overlying flaps 28. The strip of tape 46 is disposed laterally outwardly of the end of the sheet 32 opposite the extension 36 with the sheet 32 in its covering position over the opening 34.

The location of the tape permits sliding movement of the sheet 32 between the pairs of flaps effective (in a direction lengthwise of the rectangular flaps 28) to cover and uncover the opening 34.

Any sturdy packing tape can be used. But for larger boxes glass fiber reinforced adhesive tape is helpful to increase the strength of the bottom wall structure.

For shipment the extension 36 is folded against a sidewall (sidewall 16) and secured against the sidewall by strips of tape 48.

The container 10 is filled through the open top 18 with the bottom closure arrangement closed. The open top 18 of the filled container 10 is closed by positioning and securing the cap 22 in place by tape or other suitable technique.

Normally the filled container 10 rests on an industrial pallet that is constructed to permit a fork lift to locate its forks under the container to lift it for movement from location to location both during shipment on the pallet and at a production site off the pallet.

At the production site the container 10 can be placed on a frame that provides marginal support at the bototm of the container and that permits movement of the sheet 32. In practice a frame of L beam construction has proved suitable.

Once the container 10 is in position on the frame, an operator can sever the strips of tape 48 to free the extension 36. The hand holes 40 are ready for use. The operator pulls the sheet 32 to uncover the opening 34 completely or to uncover the opening 34 a desired amount. The size of the uncovered portion of the opening 34 can be reduced or closed by moving the sheet 32 to cover the opening 34 again.

When the opening 34 is uncovered, discrete material discharges to a location below, e.g. hopper or bin.

FIGS. 4 and 5 illustrate a corrugated board container 10' for dispensing a body of discrete material according to the invention. The container 10' includes the body portion 12, with sidewalls 14 and 16 and bottom flaps 24 and 28 as shown in FIGS. 1 through 3. The flaps 24 and 28 are secured in their inwardly turned closed position by adhesive.

The bottom closure arrangement includes the sheet 32. But the sheet 32 is held on the exterior of the container 10' by guide members 50 on the exterior of each of the inwardly turned overlying flaps 28. As shown the guides 50 are mutually parallel and parallel to the inner margins 30 of the flaps 28. The members 50 support and guide the member 32 along a path effective to open and close the discharge opening 34.

FIGS. 6 and 7 show another corrugated board container 60 according to the invention. The container 60 includes a hollow body portion 62 including two pairs of parallel opposed and spaced apart sidewalls 64 and 66 that define rectangular open ends, i.e., an open top 58 and an open bottom 70. A cap 72 fits over the open top 58, but other top closure means, such as flaps, can be used.

The bottom closure arrangement includes a pair of underlying opposed inwardly turned flaps 74 each having a notch 76 at its inner margin and a pair of inwardly turned opposed overlying flaps 78 each having a notch 80 at its inner margin and a slip sheet cover member 82 between the pairs of flaps.

The notches 76 and 80 are located in their respective flaps to register when the flaps are in their inwardly turned closed positions such that the edges of the notches defines an opening 84 for discharge of discrete material held in the container 60.

Unlike the flaps of the container 10, the flaps 74 are in abutting relationship with each other at their inner margins except for the notches 76. And the overlying flaps 78 abut at their inner margins except for the notches 80.

As can be seen in FIG. 8, tape secures the flaps 74 and 78 in their inwardly turned closed positions.

The sheet 82 is like the member 32 of the container 10 and is supported in slide fit relation between the underlying flaps 74 and overlying flaps 78.

The containers shown in FIGS. 1 through 7 includes flaps dimensioned to define a discharge opening centrally located in the end wall closure structure. But the flaps can also be dimensioned to locate the discharge opening at locations laterally spaced or offset from the center region of the end wall structure.

Also, it is possible to locate a cover sheet or member to move interiorly of a container as shown in FIG. 8. In this embodiment a sheet member 92 is located immediately above a bottom opening 94 formed by flaps like the flaps of the container 10. The sheet 92 moves through a slit in one of the sidewalls of the container 96 to cover and uncover the opening 94.

Moreover, it is possible to employ a hollow container body having more than two pairs of parallel spaced apart opposing sidewalls defining an end opening that has a shape other than the parallelogram.

Thus, in a broad sense the container of the invention includes a hollow body of foldable container material defining an open end. And the container uses closure means for the open end that includes a pair of flaps each hingedly connected to the hollow body and turned inwardly to form a portion of an end wall structure across the open end. Each of the flaps are dimensioned to have its inner margin in opposed spaced apart relation with the inner margin of the other of the pair of flaps. The spaced apart margin portions of the flaps define an opening for discharge of flowable material held in the container. A cover member is held at the open end on the container for movement effective to open and close the discharge opening.

In view of the foregoing description of the invention, it will be understood that modifications and variations may be effected in the form of the invention without departing from its scope and spirit.

I claim:

1. A shippable container for handling and dispensing a body of flowable material comprising:
    a hollow body of foldable container material including two pairs of spaced apart opposing side walls defining an open end; and
    closure means for the open end including a pair of underlying flaps each connected to one of an opposing pair of sidewalls and turned inwardly to form a portion of an end wall structure across the open end, each of the underlying flaps being dimensioned to have at least a portion of its inner margin in opposed space apart relation with the inner margin of the other underlying flap, a pair of overlying flaps each connected to one of the other opposing pair of sidewalls and turned inwardly over the underlying flaps, each of the overlying flaps having at least a portion of its inner margin in opposed spaced apart relation with the inner margin of the overlying flap, the spaced apart margin portions of the flaps defining an opening for discharge of flowable material held in the container, means holding the flaps in their inwardly turned position, a cover member having sufficient size to cover the discharge opening, guide means holding the cover member on the container for movement in a plane generally parallel to the inwardly turned flaps along a path effective to open and close the discharge opening, the cover member including a grip extension portion for use in moving such member, such portion being of such size as to extend in a direction along which the cover member is movable beyond a sidewall of the container when the discharge opening is covered by the cover member, such grip extension being foldable against such sidewall.

2. The container of claim 1 in which the extension portion of the cover member includes at least one hand grip opening.

3. The container of claim 1 in which the means for holding the cover member on the container includes guides on the exterior surfaces of the pair of inwardly turned overlying flaps.

4. The container of claim 3 in which the guides are parallel to each other.

5. The container of claim 1 in which the guide means includes a sidewall having a slot of sufficient size to allow movement of the cover member therein for opening and closing the discharge opening from within the container.

6. A shippable container for handling and dispensing a body of discrete material comprising:
    a hollow body of foldable container material including two pairs of spaced apart opposing sidewalls defining an open end; and
    closure means for the open end including a pair of underlying flaps each integrally connected to one of an opposing pair of sidewalls and turned inwardly to form a portion of an end wall structure, the inner margins of the underlying flaps being in opposed spaced apart relation with each other, a pair of overlying flaps each integrally connected to one of the other opposing pair of sidewalls and turned inwardly over the underlying flaps, the inner margins of the overlying flaps being in opposed spaced apart relation with each other, the margins of the flaps defining an opening for discharge of discrete material, means holding the flaps in their inwardly turned position, a sheet member larger than the discharge opening between the underlying and overlying flaps and movable therebetween along a path effective to open and close the discharge opening.

7. The container of claim 6 in which the inner margin of each of the flaps is straight.

8. The container of claim 7 in which the cover member has a surface with a lower coefficient of friction than the surfaces of flaps engaging the cover member.

9. The container of claim 8 in which the cover member is surfaced with polyethylene.

10. A shippable container for handling and dispensing a body of short length bundles of glass strand comprising:
   a hollow body of corrugated board including two pairs of parallel spaced apart opposing side walls defining open top and bottom ends;
   closure means for the top end; and
   closure means for the bottom end including a pair of underlying corrugated board flaps each integral with one of an opposing pair of sidewalls and turned inwardly to form a portion of an end wall structure across the open end, the inner margins of the underlying flaps being in opposed spaced apart relation with each other, a pair of overlying corrugated board flaps each integral with one of the other opposing pair of sidewalls and turned inwardly over the underlying flaps, the inner margins of the overlying flaps being in opposed spaced apart relation with each other, the margins of the flaps defining an opening for discharge of particulate material held in the container, tape holding the flaps in their inwardly turned position, a corrugated board slip sheet having sufficient size to cover the discharge opening movable between the underlying and overlying inwardly turned flaps along a path effective to open and close the discharge opening.

11. A shippable container for handling and dispensing a body of flowable material comprising:
   a hollow body of foldable container material including two pairs of spaced apart opposing side walls defining an open end; and
   closure means for the open end including a pair of underlying flaps each connected to one of an opposing pair of sidewalls and turned inwardly to form a portion of an end wall structure across the open end, each of the underlying flaps being dimensioned to have at least a portion of its inner margin in opposed spaced apart relation with the inner margin of the other underlying flap, a pair of overlying flaps each connected to one of the other opposing pair of sidewalls and turned inwardly over the underlying flaps, each of the overlying flaps having at least a portion of its inner margin in opposed spaced apart relation with the inner margin of the other overlying flap, the spaced apart margin portions of the flaps defining an opening for discharge of flowable material held in the container, means holding the flaps in their inwardly turned position, a member having sufficient size to cover the discharge opening held in slide fit relation between the inwardly turned underlying and overlying flaps for movement.

12. The container of claim 11 in which the inner margins of the flaps locate the discharge opening generally centrally of the end wall structure.

13. The container of claim 12 in which the cover member is constructed of the same foldable container material as the body portion of the container.

14. The container of claim 13 in which the means for holding the flaps in their inwardly turned position is tape located laterally outwardly of the sheet member.

* * * * *